(12) United States Patent
Stoeger

(10) Patent No.: US 7,251,874 B2
(45) Date of Patent: Aug. 7, 2007

(54) ELECTRICAL TOOL FOR PANNING OR MILLING

(75) Inventor: Juergen Stoeger, Neckartailfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/208,868

(22) Filed: Aug. 22, 2005

(65) Prior Publication Data

US 2006/0042061 A1 Mar. 2, 2006

(30) Foreign Application Priority Data

Sep. 2, 2004 (DE) .................... 10 2004 042 464

(51) Int. Cl.
*B23C 1/20* (2006.01)
(52) U.S. Cl. .................... 29/56.5; 409/182; 144/136.95
(58) Field of Classification Search ................. 29/56.5; 409/182, 180, 138, 215, 137, 218, 231; 144/136.95, 144/154.5, 371
See application file for complete search history.

(56) References Cited

U.S. PATENT DOCUMENTS

| | | | |
|---|---|---|---|
| 2,718,248 A | 9/1955 | Dimmer | |
| 3,893,372 A | 7/1975 | Strakeljahn | |
| 4,187,056 A | 2/1980 | Schwinn et al. | |
| 4,434,586 A * | 3/1984 | Muller et al. | 451/358 |
| 4,858,662 A * | 8/1989 | Bosten et al. | 409/182 |
| 4,858,663 A * | 8/1989 | Bosten et al. | 409/182 |
| 4,913,204 A * | 4/1990 | Moores et al. | 409/182 |
| 4,971,122 A * | 11/1990 | Sato et al. | 409/182 |
| 5,257,654 A * | 11/1993 | Bean et al. | 409/182 |
| 5,273,091 A * | 12/1993 | Shibata | 144/136.95 |
| 5,423,642 A | 6/1995 | Heck | |
| 5,667,565 A * | 9/1997 | Gondar | 409/137 |
| 5,988,240 A * | 11/1999 | Markus | 409/182 |
| 6,148,880 A * | 11/2000 | Dehde et al. | 409/182 |
| 2002/0053370 A1* | 5/2002 | Smith et al. | 144/136.95 |
| 2002/0187014 A1* | 12/2002 | Bergner et al. | 409/182 |
| 2003/0002946 A1* | 1/2003 | Hsieh | 409/178 |

FOREIGN PATENT DOCUMENTS

| | | |
|---|---|---|
| DE | 200 01 808 | 7/2001 |
| EP | 0 044 354 | 1/1982 |
| GB | 2 299 051 | 9/1996 |
| GB | 2 352 207 | 1/2001 |

* cited by examiner

*Primary Examiner*—Dana Ross
(74) *Attorney, Agent, or Firm*—Michael J. Striker

(57) ABSTRACT

An electrical tool for planning and/or milling has a motor shaft, a working shaft connected with the motor shaft, wherein the working shaft is positioned perpendicular to the motor shaft.

7 Claims, 6 Drawing Sheets

ELECTRICAL TOOL FOR PANNING OR MILLING

CROSS-REFERENCE

The invention described and claimed hereinbelow is also described in DE 10 2004 042 464.0, filed Sep. 2, 2004. This German Patent Application, whose subject matter is incorporated here by reference, provides the basis for a claim of priority of invention under 35 U.S.C. 119 (a)-(d).

BACKGROUND OF THE INVENTION

The present invention relates to an electrical tool, in particular planning or milling.

Electrical hand-held planers are already known in the art. With all of these planers, the motor shaft and planer shaft are located parallel to one other, and the main guiding handle is positioned at a 90° angle above these shafts. Due to this arrangement of motor shaft, planer shaft and handle, these known planing devices are poorly suited for machining grooves. Machining edges and lateral surfaces, in particular, is a complicated procedure using planers of this type.

In addition, routers are known, with which the milling shaft and the motor shaft are located one behind the other in one direction. These devices are guided using one or both hands, and the handles are located parallel to the motor shaft. A considerable amount of effort is also required with these milling machines to machine lateral surfaces and edges.

SUMMARY OF THE INVENTION

Accordingly, it is an object of the present invention to provide an electrical tool for planning or milling, which eliminates the disadvantages of the prior art.

In keeping with these objects and with others which will become apparent hereinafter, one feature of the present invention resides, briefly stated in an electrical tool for planning and/or milling, comprising a motor shaft; a working shaft connected with said motor shaft, said working shaft being positioned perpendicular to said motor shaft.

When the electrical tool is designed in accordance with the present invention it has the advantage that a user can very easily machine edges and lateral surfaces, e.g., of doors or windows, using this electrical tool. The user also intuitively handles the tool properly due to the perpendicular arrangement of the working shaft relative to the motor shaft and the resultant shape of the tool. Edges can therefore be easily machined vertically or horizontally.

The term "motor shaft" refers to the shaft of the electric motor of the electrical tool, via which the electric motor transfers its torque to the working shaft. Depending on the application, the working shaft can also be referred to as a planer shaft, knife shaft, or milling machine shaft. The tool head, e.g., a knife head or milling head, is attached to the working shaft. The working shaft transfers the torque of the electric motor to the tool head. The working shaft is therefore the connecting member between the motor shaft and the tool head.

The working shaft is positioned perpendicular, e.g., at a right angle, to the motor shaft. The motor shaft and the working shaft therefore form a 90° angle with each other. The motor shaft and the working shaft are preferably interconnected via a gearbox.

The electrical tool according to the present invention advantageously has a motor housing designed as a handle. This means the user grips and holds the motor housing directly, and guides the electrical tool via the motor housing. As a result, the electrical tool according to the present invention is made smaller and easier to handle. If the motor housing is also oriented in the direction of the feed motion of the electrical tool, the shape of the electrical tool ensures that the user holds and handles the tool correctly, thereby preventing misuse. The direction of the feed motion is the direction in which the electrical tool is propelled when a work piece is being machined.

The working shaft is preferably supported on one side, thereby resulting in an endless groove depth, e.g., when the tool is used to machine grooves. In this case, the working shaft is supported on the end at which it is interconnected with the motor shaft. The other end of the working shaft is free and can accommodate an appropriate tool head.

In a further embodiment of the present invention, the electrical tool has a base and a lateral guide surface. The base is a flat section that enables the electrical tool to be placed on the work piece to be machined. The same function is also performed by the lateral guide surface. The surface of the fixed base and the lateral guide surface form a certain angle with each other, thereby enabling both surfaces to be placed—in a form-fit manner—on the corresponding surfaces of an edge of a work piece having a matching shape. The angle between the base and the lateral guide surface can be adjustable, thereby enabling the electrical tool to be adapted for use on different edges of different work pieces. The angle between the base and the lateral guide surface can also be fixed, however. In this case, the angle is preferably 90°, and is therefore a right angle.

If the angle between the base and the lateral guide surface is fixed at 90°, the lateral guide surface can also have a bezel, and the base can have a V-groove. As a result, despite a fixed angle between the base and the lateral guide surface, a slant can still be bevelled without using any further auxiliary devices, such as adjustable angled stops.

Preferably, the height of the lateral guide surface is adjustable, thereby allowing the planing or milling width to be equal to the groove width when the tool is used to machine grooves.

The base can also include a first, fixed base and a second, adjustable base. The second base is therefore movable, thereby enabling adjustment of the depth of penetration of the electrical tool in the work piece to be machined. The second base is preferably adjustable using a rotary knob provided for this purpose.

It is advantageous if the electrical tool according to the present invention also includes a collecting container for collecting chips. The chips produced during machining of the work piece are then conveyed directly into the collecting container. The chips which are produced are prevented from contaminating the work area and are easily discarded by emptying the collecting container.

The electrical tool according to the present invention can also have a lateral contact-prevention device. This device serves to cover one end of the tool head, thereby ensuring that a user does not accidentally touch the end of the tool head during operation of the electrical tool, and injure himself. The lateral contact-prevention device is preferably movable—pivotable, in particular—thereby enabling the covered end of the tool head to be accessed as needed.

In a preferred embodiment of the present invention, the electrical tool is an electrical hand-guided planer. It can also be a milling tool, however.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
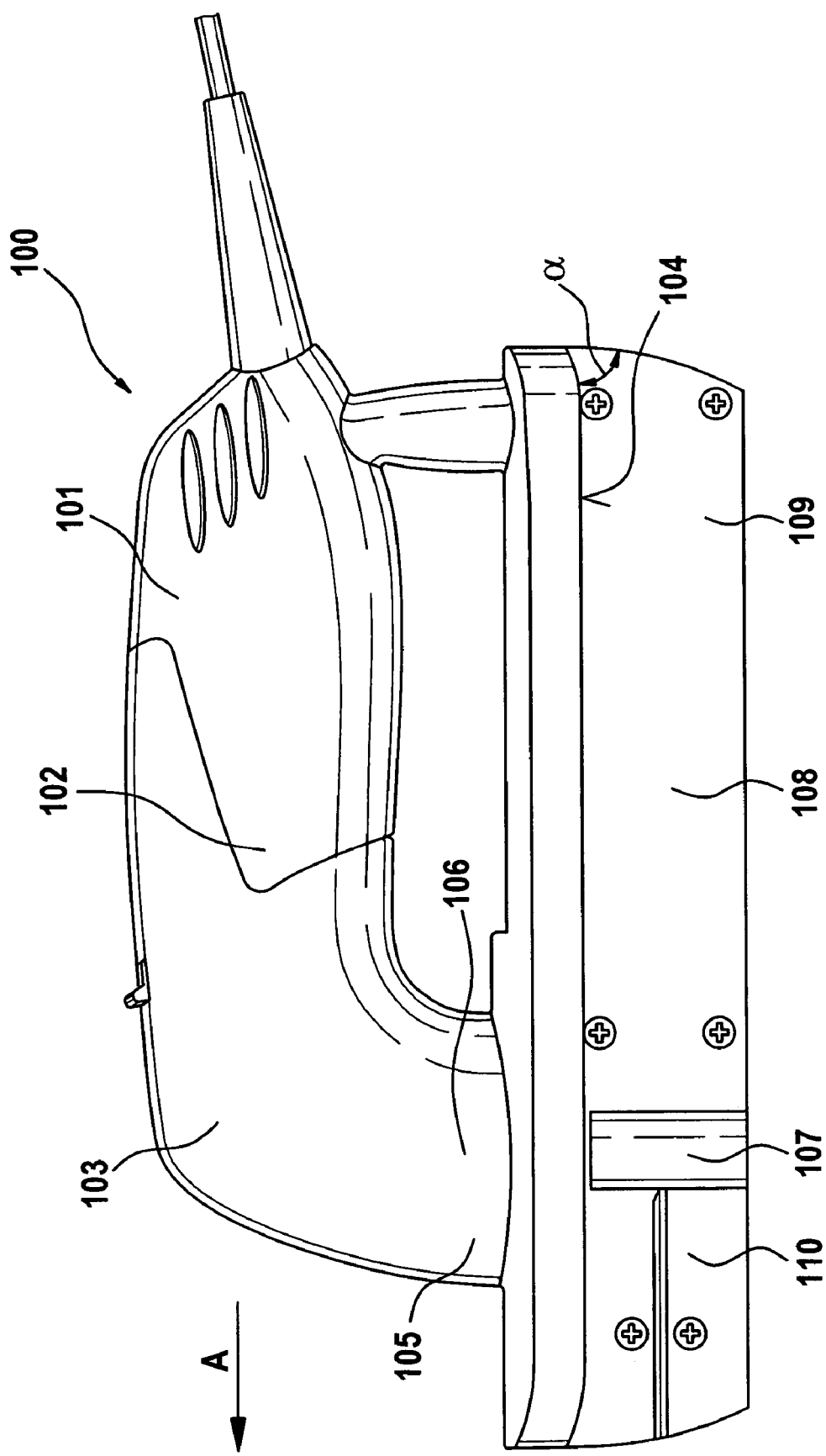
FIG. 1 shows the front view of a first electrical hand-guided planer according to the present invention.

FIG. 1 shows a first electrical hand-guided planer 100. Electrical hand-guided planer 100 has a motor housing 101, which serves simultaneously as a gripping surface for the user's hand. Motor shaft 102 (not shown) is located in motor housing 101. A front section 103 abuts motor housing 101. The gearbox of hand-guided planer 100 is housed in this section, 103. A bearing system for tool heads is also provided in the region of front section 103. A lower section 105 abuts front section 103. A working shaft 106 (not shown) is located in lower section 105. Working shaft 106 is interconnected with motor shaft 102 in front section 103 via the gearbox. A knife head 107 is attached to the lower end of working shaft 106.

The lower region of electrical hand-guided planer 100 is composed of a base 108 and a lateral guide surface 104. Base 108 and lateral guide surface 104 form an angle α with each other, the angle measuring 90°.

Base 108 is composed of a first, fixed base 109 and a second, movable base 110. Movable base 110 is adjustable perpendicularly to the plane of the figure, thereby enabling adjustment of the cutting depth of electrical hand-guided planer 100.

Figure 2:
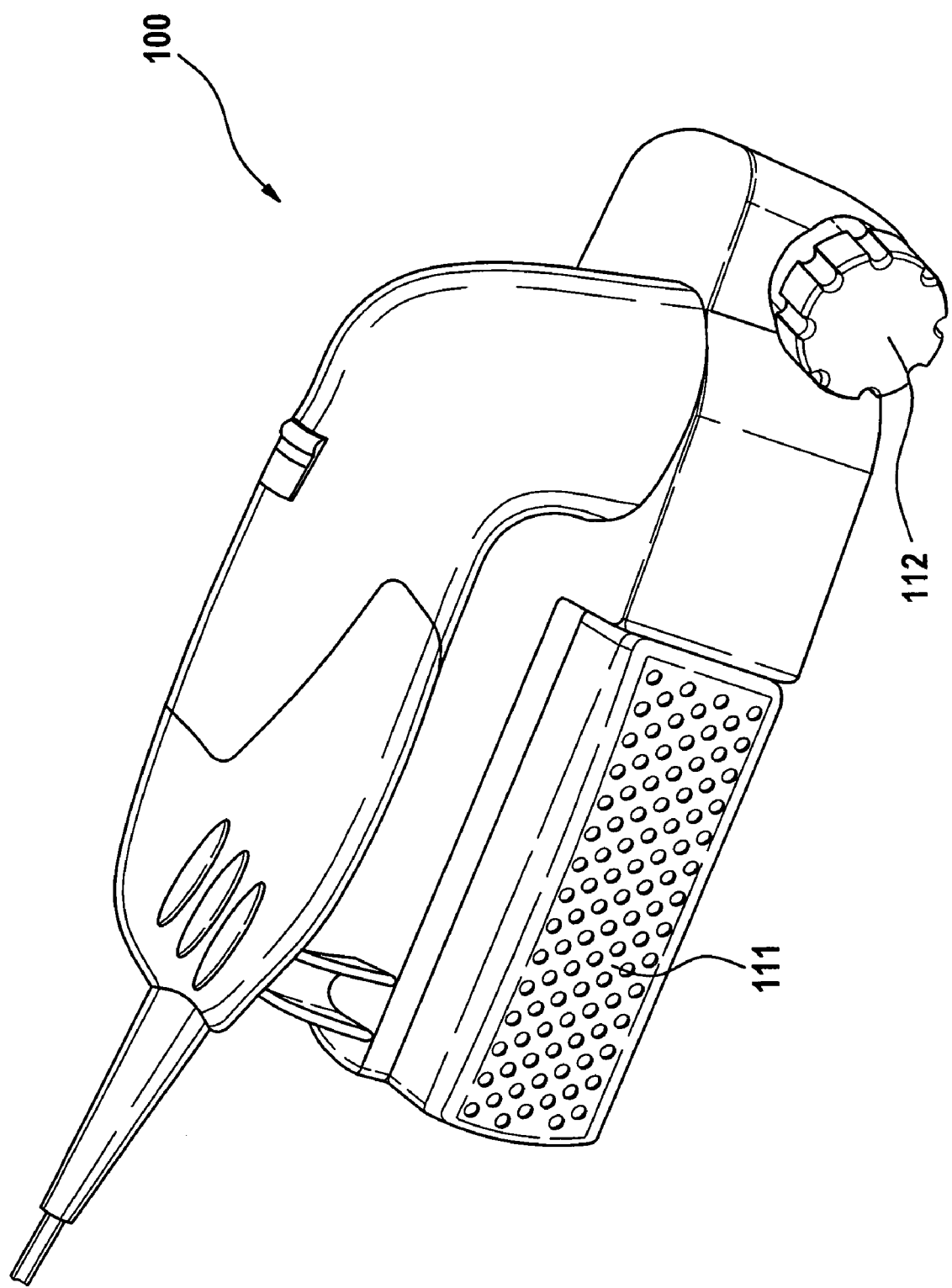
FIG. 2 shows the back side of the electrical hand-guided planer according to the present invention, per FIG. 1.

FIG. 2 shows the back side of electrical hand-guided planer 100. Collecting container 111 of hand-guided planer 100 is shown in this view. The collecting container can also be referred to as a dust box. A rotary knob 112 is also shown; it enables adjustment of second base 110 and, therefore, the cutting depth.

The mode of operation of electrical hand-guided planer 100 will be explained below.

It is assumed that electrical hand-guided planer 100 will be used to plane a right-angled groove in a wood slat. The desired cutting depth of electrical hand-guided planer 100 is first set using rotary knob 112. To do this, electrical hand-guided planer 100 is placed against the end of the edge of the wood slat in which the groove will be machined. Movable base 110 and the front part of lateral guide surface 104 enclose the edge of the wood slat to be machined in a form-fit manner. In this state, knife head 107 rests against the end of the edge. Electrical hand-guided planer 100 can now be switched on to start the planing process. Electrical hand-guided planer 100 is moved forward in the direction of arrow A (refer to FIG. 1), whereby knife head 107 penetrates the end of the edge. The direction indicated by arrow A can also be referred to as the feed direction of the electrical hand-guided planer.

Due to the form-fit guidance enabled by lateral guide surface 104 and base 108, electrical hand-guided planer 100 can be guided securely and accurately along the edge of the work piece. Due to the fact that working shaft 106 is perpendicular to motor shaft 102, and the fact that motor housing 102 serves simultaneously as a handle, electrical hand-guided planer 100 is easy to hold while it is used to machine edges.

With electrical hand-guided planer 100, edges can be easily machined vertically or horizontally.

Figure 3:
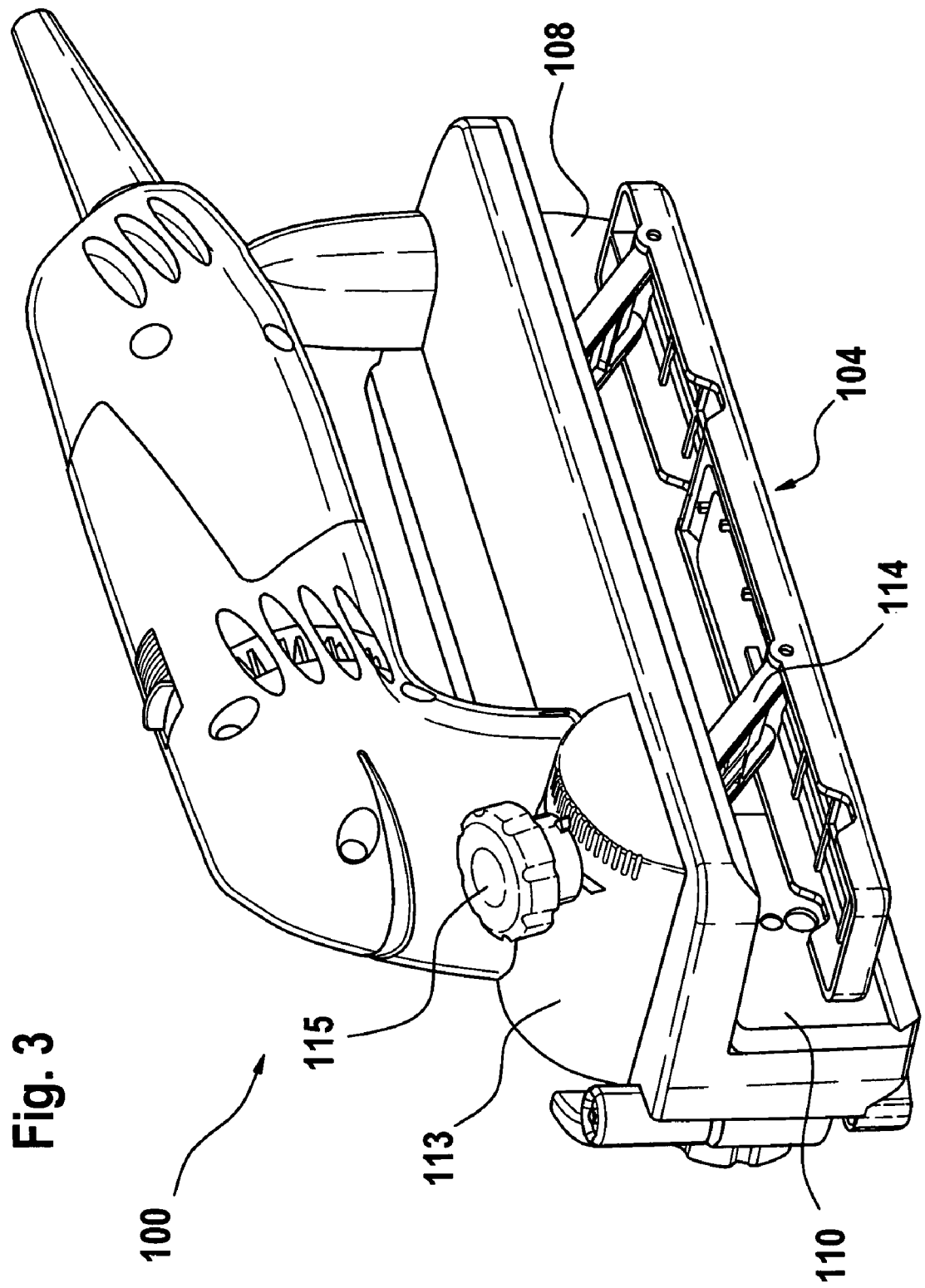
FIG. 3 shows the front view of a second electrical hand-guided planer according to the present invention.

FIG. 3 shows a second electrical hand-guided planer 200. The design of hand-guided planer 200 is basically the same as that of hand-guided planer 100, although it has a few additional features. Components of hand-guided planer 200 which are identical to those of hand-guided planer 100 are labeled with the same reference numerals.

Unlike hand-guided planer 100, hand-guided planer 200 includes a height-adjustment 113 for lateral guide surface 104. The height of lateral guide surface 104 is adjustable using two pivotable carriers 114. The user of hand-guided planer 200 can adjust the desired height of lateral guide surface 104 using a rotary knob 115.

Figure 4:
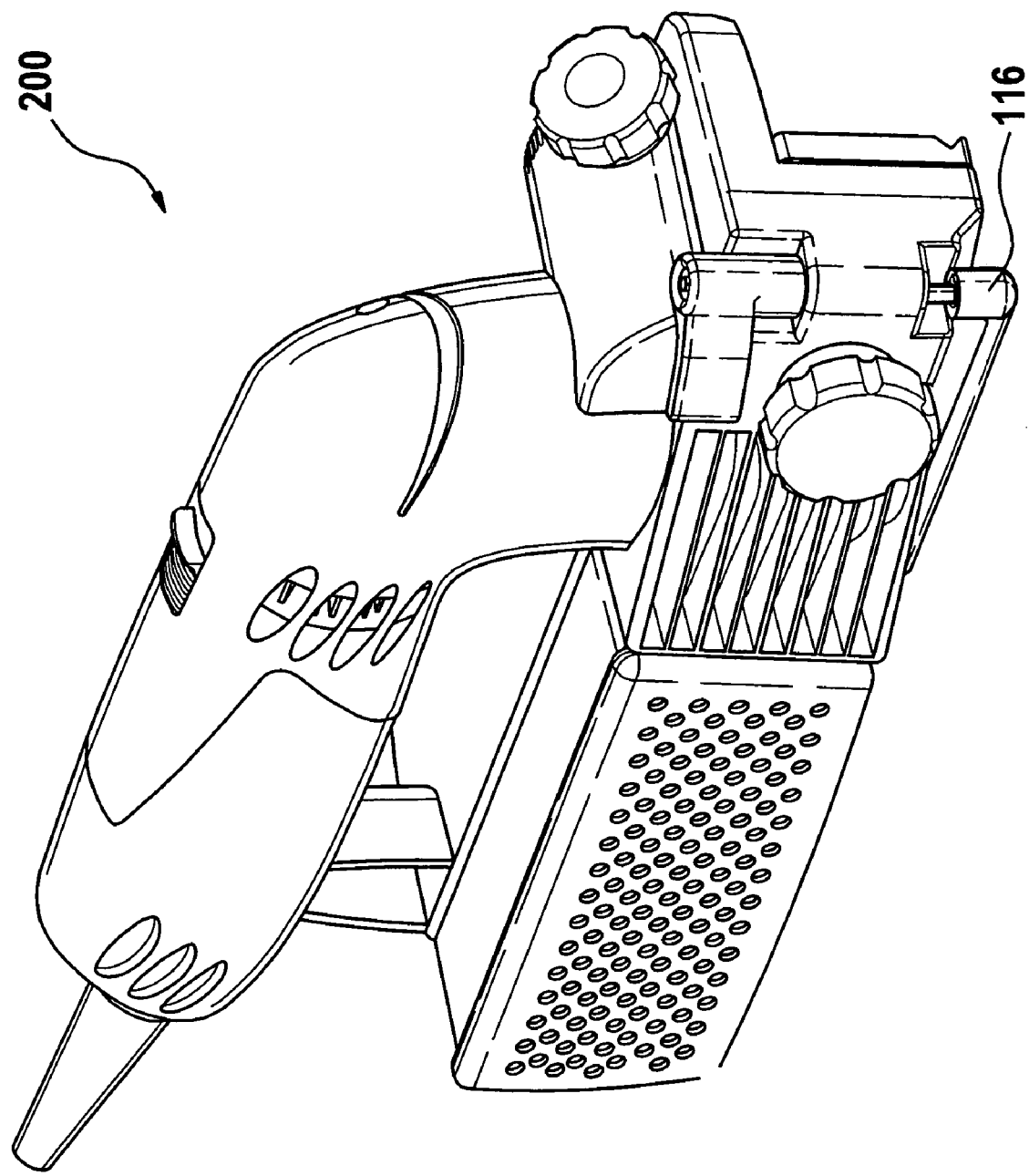
FIG. 4 shows the back side of the electrical hand-guided planer according to the present invention, per FIG. 3.

Hand-guided planer 200 also has a lateral contact-prevention device 116, as shown in FIG. 4. Contact-prevention device 116, in its position shown in FIG. 4, covers lower free end 117 of tool head 107 (refer also to FIG. 5). The user is thereby prevented from accidentally touching lower end 117 of rotating tool head 107 while operating hand-guided planer 200. Contact-prevention device 116 is pivotable, thereby enabling lower end 117 to be exposed. This allows tool head 107 to be replaced as necessary.

Figure 5:
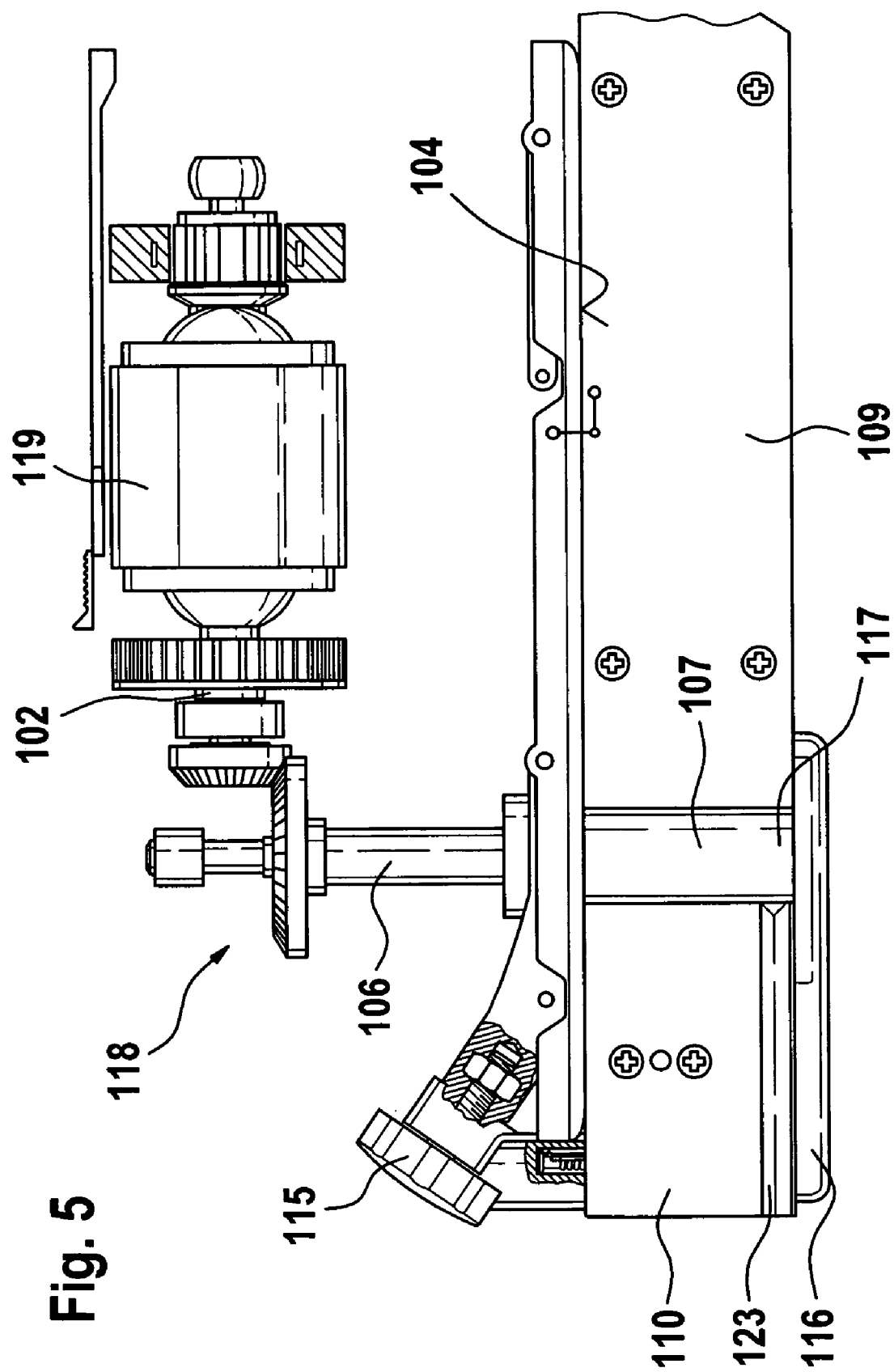
FIG. 5 shows a view of the internal components of the electrical hand-guided planer according to FIG. 3.

FIG. 5 shows the internal components of electrical hand-guided planer 200. Motor shaft 102 is arranged horizontally and is interconnected with vertical working shaft 106 via a gearbox 118. Motor shaft 102 is part of an electric motor 119.

Figure 6:
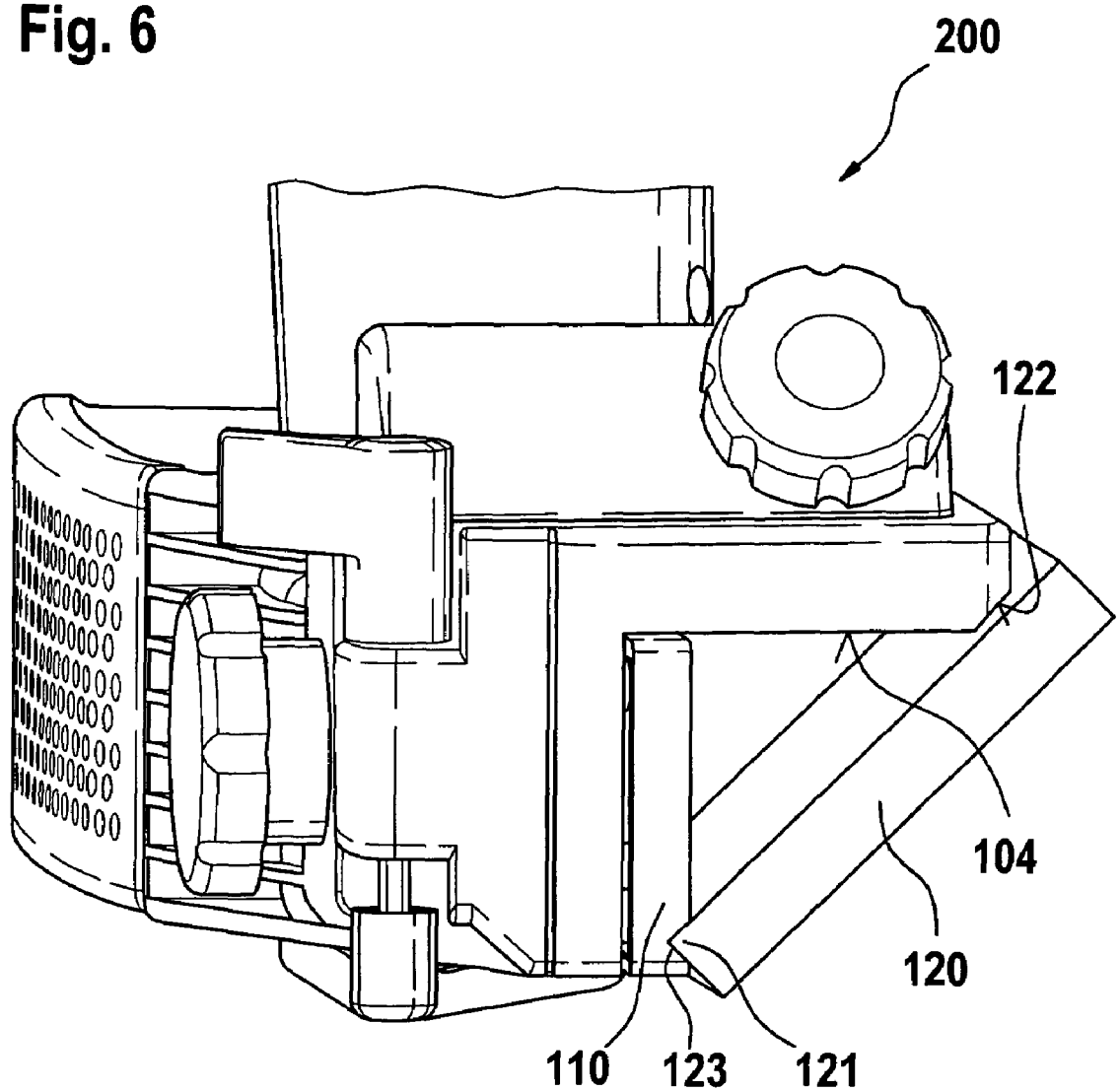
FIG. 6 shows a front view of the electrical hand-guided planer according to FIG. 3, on a work piece.

FIG. 6 shows the front of hand-guided planer 200. In FIG. 6, hand-guided planer 200 rests against a slanted work piece 120. Hand-guided planer 200 will be used to bevel edge 121 of work piece 120. In this process, a good, secure seat of hand-guided planer 200 on slanted work piece 120 is achieved via a bevel 122 on lateral guide surface 104 and a V-groove 123 of second base 110. Bevel 122 rests flush against the top surface of work piece 120, and edge 121 is accommodated by V-groove 123 in a form-fit manner; this ensures simple, reliable bevelling of edge 121. Thanks to bevel 122 and V-groove 123, edge 121 can be bevelled without the use of any further auxiliary devices.

It will be understood that each of the elements described above, or two or more together, may also find a useful application in other types of constructions differing from the types described above.

While the invention has been illustrated and described as embodied in an electrical tool for planning or milling, it is not intended to be limited to the details shown, since various modifications and structural changes may be made without departing in any way from the spirit of the present invention.

Without further analysis, the foregoing will reveal fully revel the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. An electrical tool for planning and/or milling, comprising a motor housing; a motor shaft; a working shaft connected with said motor shaft, said working shaft being positioned perpendicular to said motor shaft; fixed base arranged vertically and parallel to said motor housing and placeable on a work piece to be machined so that the latter is guided against the fixed base to define a cutting plane; and a lateral guide surface positioned at an angle to the fixed base, wherein the fixed base and the lateral guide surface define a space therebetween for receiving the work piece, and wherein the working shaft and the motor shaft are disposed parallel to the cutting plane.

2. An electrical tool as defined in claim 1; and further comprising a motor housing, said motor housing being configured as a handle.

3. An electrical tool as defined in claim 1; and further comprising a motor housing, said motor housing being oriented in a direction of a feed motion of the electrical tool.

4. An electrical tool as defined in claim 1, wherein the working shaft is mounted in the electric tool at an end of the working shaft proximal to a connection between the working shaft and the motor shaft.

5. An electrical tool as defined in claim 1, wherein the fixed base and the lateral guide surface are arranged at an adjustable angle to one another.

6. An electrical tool as defined in claim 1, wherein the fixed base and the lateral guide surface are arranged at a fixed angle to one another.

7. An electric tool as defined in claim 1; and further comprising a rotatable cutting tool positioned with its bigger part behind said fixed base and therefore behind the cutting plane, so that only its smaller part extends through the fixed base and defines the cutting plane, wherein the fixed base has a slit through which the cutting tool is partly extending, and wherein the fixed base and an axis of the cutting tool are arranged so that they are perpendicular to the workpiece to be machined.

\* \* \* \* \*